Nov. 17, 1970 R. R. LAW 3,541,244

TV BANDWIDTH REDUCTION SYSTEM

Filed Jan. 15, 1968 4 Sheets-Sheet 1

INVENTOR.
RUSSELL R. LAW,
BY
Robert Thompson
ATTORNEY

TV BANDWIDTH REDUCTION SYSTEM

TV BANDWIDTH REDUCTION SYSTEM

Filed Jan. 15, 1968 4 Sheets-Sheet 4

United States Patent Office 3,541,244

Patented Nov. 17, 1970

3,541,244

TV BANDWIDTH REDUCTION SYSTEM

Russell R. Law, Malibu, Calif., assignor to Hughes Aircraft Company, Culver City, Calif., a corporation of Delaware Filed Jan. 15, 1968, Ser. No. 697,822
Int. Cl. H04n 5/78, 7/12
U.S. Cl. 178—6.6 20 Claims

ABSTRACT OF THE DISCLOSURE

A video tape recorder system including an encoder for sampling video information in a repetitive pattern of evenly-spaced information elements; a multichannel recorder coupled to record the encoded information; and a playback processor for playing back each encoded information element three times—once as a real time information element and the other times as leading and trailing artificial elements—preferably from the subsequent and preceding adjacent interlaced lines of a leading and a trailing field, respectively, to fill in the otherwise blank space between spaced real time information elements in the real time field.

This invention relates generally to improvements in reduced bandwidth television systems and more particularly to improvements in recording and reproducing television signals.

In the television technology, it is sometimes desirable to reduce the bandwidth requirements of a television signal in order to make the signal compatible with the bandwidth limitations of some other medium such as a video tape recorder. One way to reduce the bandwidth requirements is to take advantage of the redundancy in the frame-to-frame video information and the ability of the human sight process to fill in missing information.

In this regard, in my copending patent application, Ser. No. 563,763, entitled "Television Bandwidth Reduction," filed on July 8, 1966, a system is disclosed in which the video information is sampled and recorded in a select, evenly-spaced stable pattern that recurs every "X" lines. This sampled information is further divided into complementary sets of data with each separate set being recorded on a separate channel. For example, if two complementary sets of data were sampled, they would be recorded on two channels, and if four complementary sets of data were sampled, they would be recorded on four channels.

It is an object of this invention to provide improvements in means and method in processing sampled video data for recording thereof.

Another object is to provide means and method for reducing the bandwidth requirements of sampled video information in a unique manner so that when the video information is reproduced, it provides a high resolution picture.

Another object is to provide a means and method for increasing the resolution of sampled video information when reproduced.

Other objectives of this invention can be attained by providing in a system of the type having an encoder which samples a television luminance signal Y in a stable pattern characterized by evenly-spaced sampled data that is repeated every "X" lines. The sampled bits of data are fed sequentially through a plurality of parallel channels to a recorder operably coupled for recording the sampled data bits on a plurality of parallel recording channels. A decoder is operably coupled to receive played back sampled data on a plurality of parallel channels and is operable to recombine the played-back sampled data into a reconstructed luminance signal Y. An improvement is provided therein of a recorder processor which is coupled to receive the plurality of channels of sampled data for reducing the instantaneous bandwidth requirements thereof by recording every other bit of sampled data, such as the odd-numbered bits, sequentially on a first and a second recording channel for one frame, and thereafter recording the even-numbered bits of sampled data on the first and the second channels during the next frame, and so forth, so that there are at least two complementary sets of sampled data. And a playback processor which is coupled to receive played back sampled data signals from the recorder for utilizing each bit of played back information, preferably three times, once as a real element without any delay and the other times as an artificial element after a one field or more field delay or with one or more field lead to fill in otherwise blank information areas between real time data bits on the real time field, and then selectively feeding the real time information bits and the artificial information bits to a decoder on a plurality of channels where the information bits are reconstructed into a composite luminance signal.

Other objects, features and advantages of this invention will become apparent upon reading the following detailed description and referring to the accompanying drawings, in which.

Figure 7:
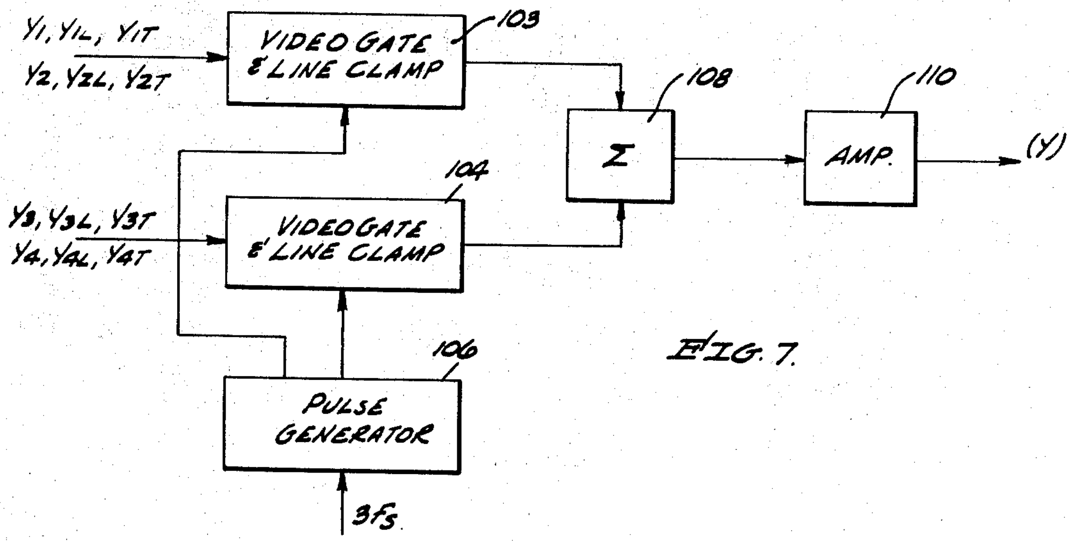
Figure 6:
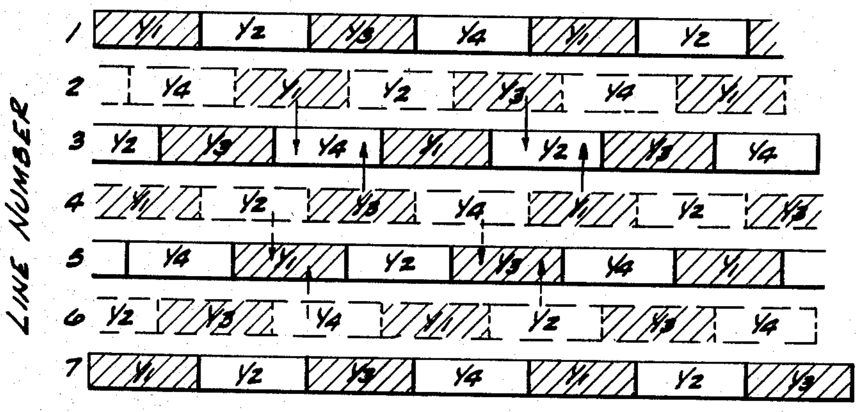
Figure 4:
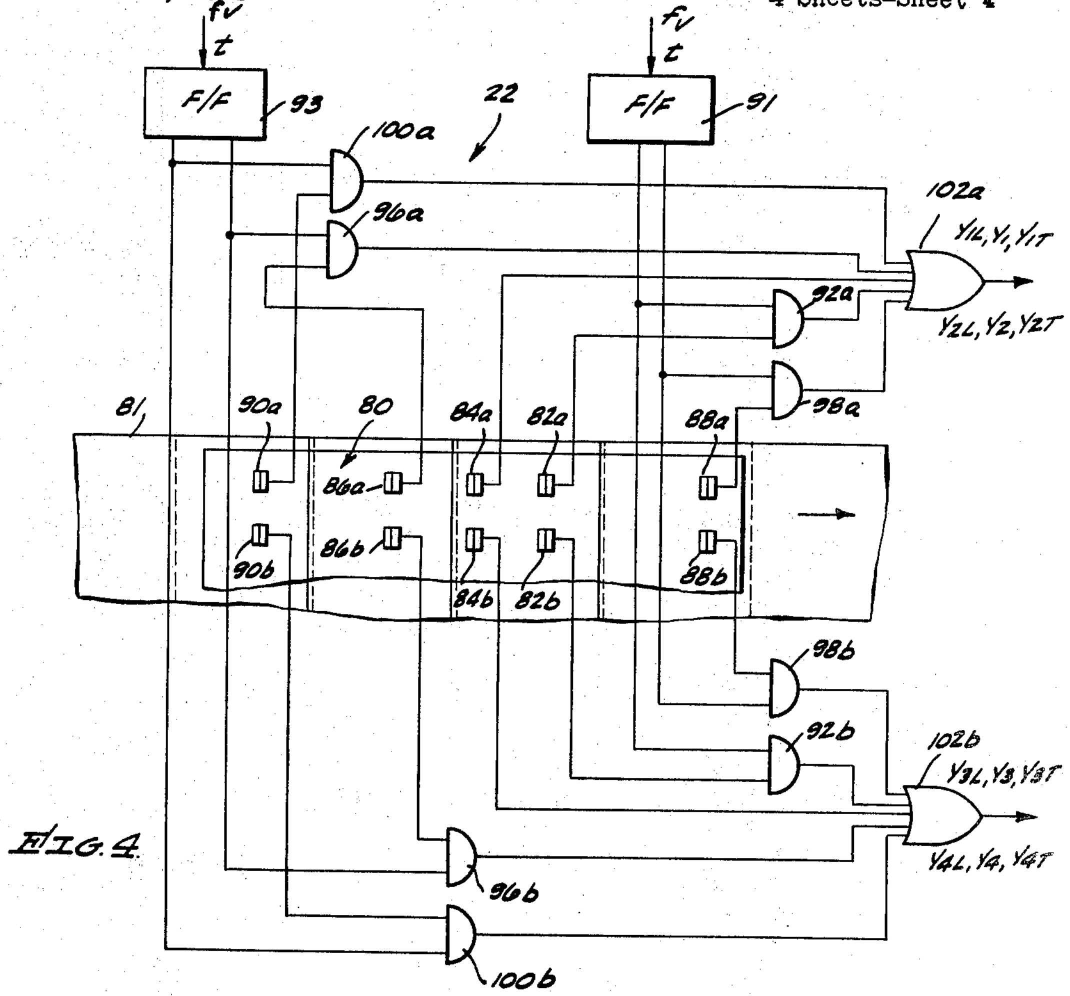
FIG. 4 is a schematic diagram of the playback pickups and playback signal processor.

FIG. 6 is a graphical illustration of a portion of a video picture area showing the relationship of the played back video signal and the operation thereon by the playback processor of FIG. 4 for a first frame of cross-hatched odd-numbered information elements and a second frame of non-cross-hatched even-numbered information elements—with arrows indicating the interlaced leading and trailing artificial elements which supplement real time information elements; and FIG. 7 is a schematic diagram of the decoder which recombines the two channels of real time information elements and artificial information elements on a single channel.

Figure 1:
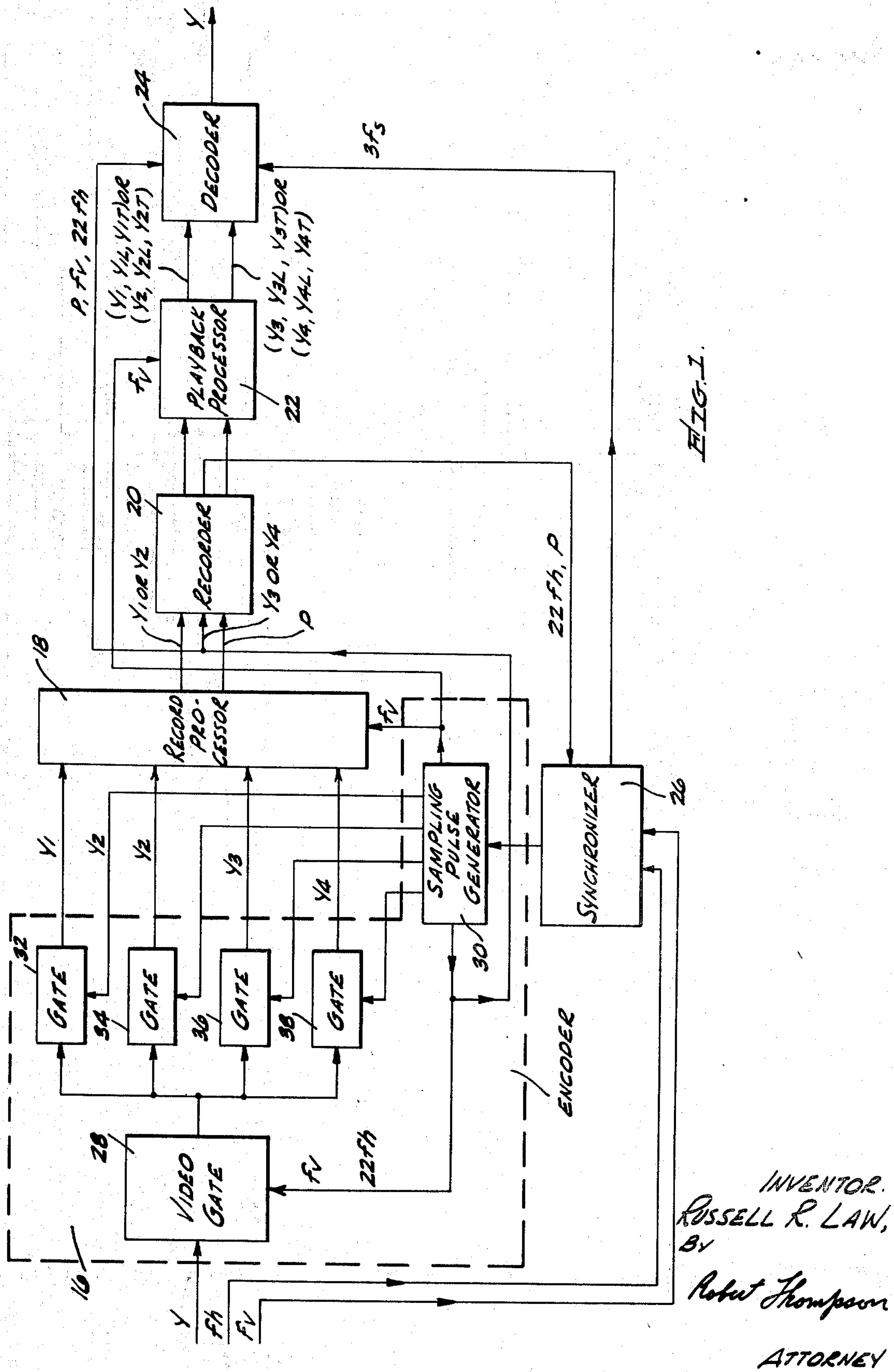
FIG. 1 is a block diagram of the improvements in the television system showing the relationship of a record processor and a playback processor to an encoder, a recorder, and a decoder.

Referring now to an embodiment of a VTR (video tape recorder) system, FIG. 1 illustrates a circuit in which the luminance signal Y is received from a convenient tap point in a television receiver (not shown) by an encorder circuit 16. The received luminance signal Y is sampled and encoded in a stable pattern and is then fed on a plurality of parallel output channels as evenly-spaced sampled data $Y_1$, $Y_2$, $Y_3$, and $Y_4$ to a record processor circuit 18. The record processor circuit 18 combines the four channels of sampled data signals so that only two channels of information, such as the channels carrying a first set of odd-numbered information elements $Y_1$ and $Y_3$, are fed to the recorder 20 and recorded during one frame (two fields), and the channels carrying a complementary second set of even-numbered information bits $Y_2$ and $Y_4$ are fed to the recorder 20 during the next frame.

On playback, the previously recorded signals are received by a playback processor circuit 22, which processes and combines the signals so that the sampled data signals $Y_1$ through $Y_4$ are each used at least twice—preferably three times—once as a real element (nondelayed) and any other times as artificial elements after a one field or three field delay or with a one field on three field lead. For example, during each arbitrarily designated odd-numbered video frame, the odd-numbered real time information elements or bits $Y_1$ and $Y_3$ and their related leading artificial information elements or bits, $Y'_{1L}$ and $Y'_{3L}$ and lagging or trailing artificial information elements or bits $Y_{1T}$ and $Y_{3T}$ from the adjacent interlaced lines are used to reconstruct the video signal. On the arbitrarily designated even-numbered frames, the even-numbered real information elements or bits $Y_2$ and $Y_2$ and $Y_4$ and their related leading artificial information elements or bits $Y_{2L}$ and $Y_{4L}$ and lagging artificial information elements or bits $Y_{1T}$ and $Y_{3T}$ from the adjacent interlaced lines are used to reconstruct the video signal. As a result, when the signals are processed by a decoder 24, the artificial elements from the preceding or leading field and from the trailing or lagging field effectively fill in what would otherwise be a blank space between real time elements in the real time video field, thereby giving higher resolution than would otherwise exist.

In describing the operation of the circuit illustrated in FIG. 1 in more detail, the encoder 16 can be of the type disclosed in my previously referenced copending patent application S.N. 563,763. By way of background, a synchronizer 26 is responsive to base frequency signals such as the vertical sync signal $f_v$ and the horizontal sync signal $f_h$ associated with the television video signal Y to produce a tone burst signal $22f_h$ and a vertical sync signal $f_v$. The luminance signal Y is fed to a video gate 28 wherein the tone burst signal of $22f_h$ generated by the synchronizer 26 is applied to the start of each field coincident with the vertical sync signal $f_v$. Thereafter this tone burst signal $22f_h$ can be utilized as a reference signal by the synchronizer 26 during playback as described in the previously referenced copending patent application S.N. 563,763.

In addition, the synchronizer generates sampling sync signals $f_s$ which are fed to a sampling pulse generator 30.

Figure 2:
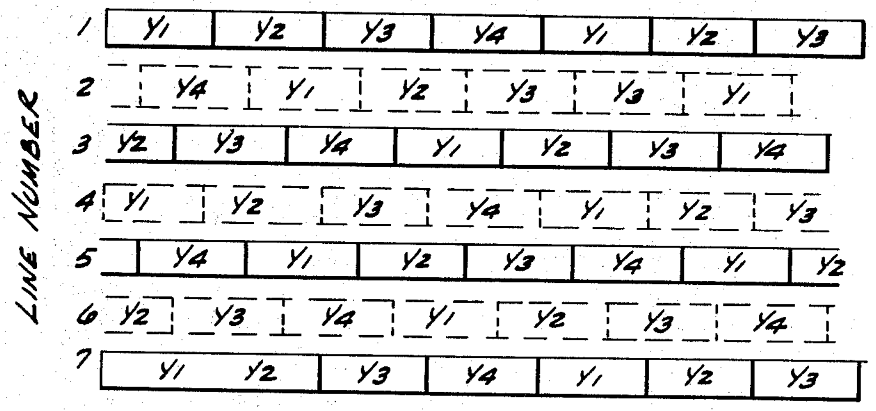
FIG. 2 is a graphical illustration showing a preferred sampling pattern of a portion of a video picture in which individual information bits are illustrated as rectangles with the subscripts therein indicating the sampling sequence as even-numbered and odd-numbered information elements.

The sampling pulse generator 30 generates four sampling pulse trains which are fed to four parallel gates 32, 34, 36 and 38. The phases or timing of the pulses of the individual sampling pulse trains are staggered so that the gates 32 through 38 are sequentially enabled for short periods of time. As a result, the luminance signal Y which is applied simultaneously to the gates 32 through 38 is sequentially conducted to the record processor 18 on four separate channels as four evenly spaced sampled data signals $Y_1$, $Y_2$, $Y_3$, and $Y_4$ in the pattern illustrated in FIG. 2. One preferred sampling pattern would be to make at least an average of 40⅓ samples per line in a pattern that is repeated after every three horizontal video lines.

The record processor 18 receives the sampled data signals $Y_1$, $Y_2$, $Y_3$, and $Y_4$ sequentially on four channels and processes them on a frame-by-frame basis so that during one frame, the odd-numbered sampled data $Y_1$ and $Y_3$ are fed to the recorder 20 on two output channels and during the next frame, the even-numbered sampled data signals $Y_2$ and $Y_4$ are fed to the recorded 20 on the two output channels.

Figure 3:
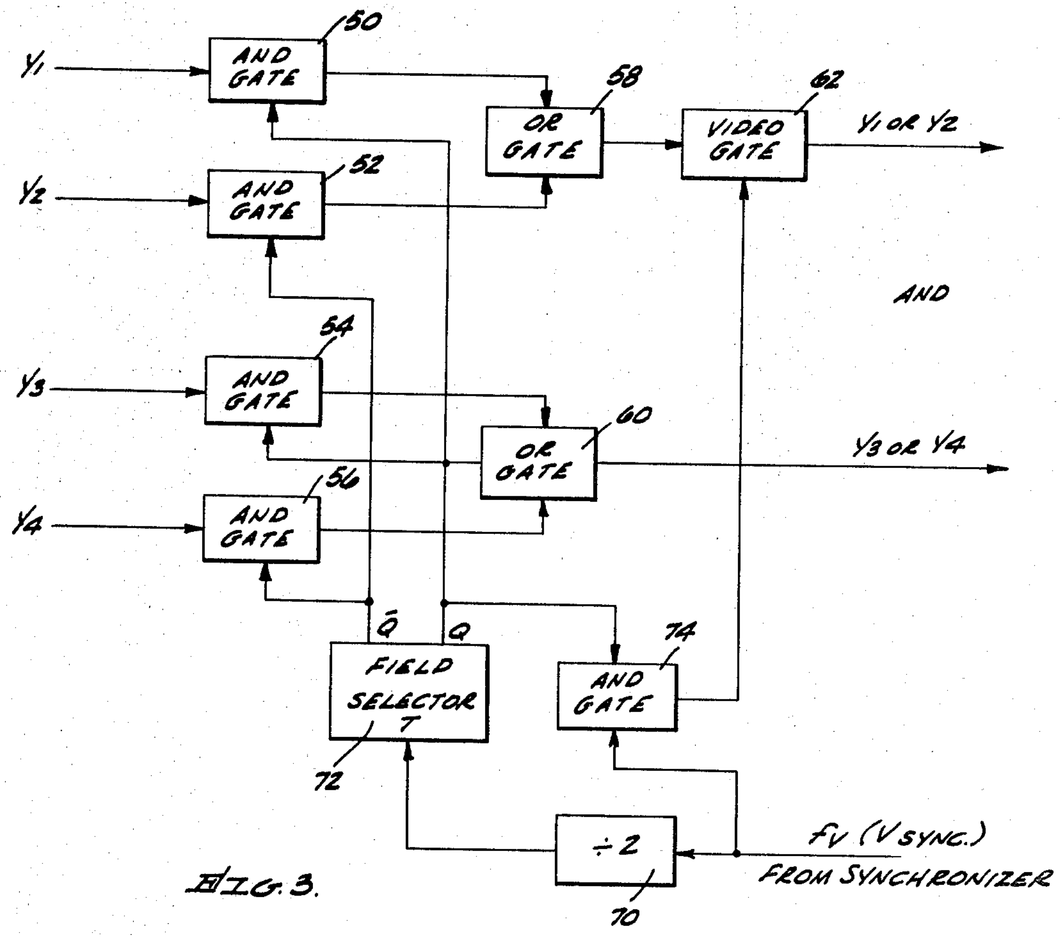
FIG. 3 is a schematic diagram of the record processor.

With regard to the details of the record processor 18, reference is made to the circuit illustrated in FIG. 3, which includes four parallel circuit branches, each branch having an AND gate 50, 52, 54, and 56, connected to receive the four sampled data signals $Y_1$, $Y_2$, $Y_3$, and $Y_4$, respectively. The AND gates and other circuit components hereinafter described have a corresponding circuit component disclosed in my previously referenced copending patent application S.N. 563,763. Consequently, reference to the copending patent application will not hereinafter be repeated for each circuit element. In operation, the AND gates 50 through 56 are enabled and inhibited on a frame-by-frame basis so that during a first arbitrarily selected frame (two fields), the AND gates 50 and 54 are enabled to conduct the sampled data signals $Y_1$ and $Y_3$ respectively to the OR gates 58 and 60, while the AND gates 52 and 56 are inhibited from conducting the sampled data signals $Y_2$ and $Y_4$. Consequently, the output from OR gates 58 and 60 are the sampled data signals $Y_1$ and $Y_3$ respectively, which are fed to the two output channels, one of which includes a video gate 62 that removes the tone burst signal $22f_h$ from every other frame.

During the next frame, the AND gates 52 and 56 are enabled to conduct the sampled data signals $Y_2$ and $Y_4$ to the OR gates 58 and 60 respectively, while the AND gates 50 and 54 are inhibited from conducting the sampled data signals $Y_1$ and $Y_3$. As a result, the output from OR gates 58 and 60 are the sampled data signals $Y_2$ and $Y_4$ respectively, which are fed to the two output channels.

In order to attain this frame-by-frame switching operation, the vertical sync signal $f_v$ generated by the synchronizer 26 (FIG. 1) is fed to toggle a ÷2 circuit 70 such as a bistable multivibrator of the type described and illustrated in my previously referenced copending patent application S.N. 563,763. The ÷2 circuit 70 produces a desired output pulse edge once every frame which is fed to a field selector 72. The field selector 72 can be a bistable multivibrator of the type described in my previously referenced copending patent application which is toggled by the input signal so that a set output signal Q is at a predetermined level during one frame duration and the clear output $\overline{Q}$ is at the predetermined output level during a subsequent frame, and so forth, in the same repetitive pattern. Thus, when the set output signal is at the predetermined level, the AND gates 50 and 54 are enabled, and when the reset output signal is at the predetermined level, the AND gates 52 and 56 are enabled.

In order to remove the tone burst signal $22f_h$ from every other video frame, the video gate 62 is inhibited by an output signal from an AND gate 74 during the period of the vertical sync pulse $f_v$ during every frame. In operation, one input to AND gate 74 is coupled to receive the set output signal Q from the field selector 72 while a second input to the AND gate 74 is coupled to receive the vertical sync pulse $f_v$ from the synchronizer 26 (FIG. 1). Thus, when there is coincidence between the two input signals to AND gate 74, an output signal is produced which is fed to the video gate 62. This output signal has the same duration as the vertical sync pulse $f_v$ and effectively inhibits the video gate 62 during this time period. As a result, the tone burst signal $22f_h$, which would normally be conducted through the video gate 62 during this time period, is blocked and consequently is not recorded. During the next frame, the set output signal from the field selector 72 is at a second level and thus the AND gate 74 is inhibited from producing an output pulse when the vertical sync pulses $f_v$ are received at the other input terminal. Consequently, the video gate 62 will conduct the tone burst signal $22f_h$, which is fed to the recorder 20.

The recorder 20 illustrated in FIG. 1 can be a multiple tract recorder in which the tape and the recording heads travel lineraly relative to one another at a tape speed of about 30 i.p.s. (inches per second). One tape recorder that could be used is disclosed in my previously referenced copending patent application S.N. 563,763.

On playback, the magnetic tape 81 or recording medium is rerun past a multiple channel playback head 80 so that the two channels of video information, a pilot signal P, and the tone burst signal $22f_h$ are reproduced.

Referring to the portion of the multichannel playback head 80 and playback processor 22 associated with the video information or sampled data recorded on two tracks of a magnetic tape 81, each channel has five spaced pickups which produce the real time information elements the leading artificial information elements, and the trailing artificial information elements. For example, for the channel associated wiht the magnetic tape track having the sampled data $Y_1$ or $Y_2$ recorded thereon the playback head 80 includes three interior pickups 82_a_, 84_a_ and 86_a_ spaced apart along the direction of relative tape travel past the head 80 for simultaneously playing back recorded information from tape areas spaced by about one field plus and minus small increments. The two outermost pickups 88_a_ and 90_a_ are spaced from the two adjacent interior pickups 82_a_ and 86_a_ at distances corresponding to tape information areas spaced from the adjacent pickup areas by about one video frame (two fields) or, in other words, a total of three fields plus and minus respectively the small increments preceding and lagging the real time elements. In the embodiment being described with reference to FIGS. 4 and 5, if the tape speed is 30 i.p.s., one interior pickup 82_a_ is leading the central real time pickup 84_a_ by one half an inch plus a small increment equivalent to vertical registry on the subsequent adjacent interlaced horizontal video line. The other interior pickup 86_a_ is lagging or trailing the central real time pickup 84_a_ by one half an inch minus a small increment equivalent to vertical registry on the preceding adjacent interlaced horizontal video line. The outermost leading pickup 88_a_ is spaced from the adjacent interior leading pickup 82_a_ by one inch or two fields and the outermost lagging pickup 90_a_ is trailing from the adjacent interior lagging pickup 86_a_ by one inch or two fields.

The other channel associated with the track having the recorded information elements $Y_3$ and $Y_4$ recorded thereon includes five corresponding pickups, 82_b_, 84_b_, 86_b_, 88_b_, and 90_b_ which have the same spacing and relative positions as the above described pickups associated with the recording track having the information elements $Y_1$ and $Y_2$ recorded thereon. Consequently, the description of one channel of pickups is applicable to the other channel.

In operation, the centermost real time pickups 84_a_ and 84_b_ continually play back the real time information elements during every field, and the leading and lagging pickups are alternately switched from one to the other on a field-by-field basis to play back artificial information. For example, only one of the two leading pickups 82_a_ or 88_a_ in one channel and one of the other two leading pickups 82_b_ or 88_b_ in the other channel, and one of the two lagging pickups 86_a_ or 90_a_ and one of the two leading pickups 86_b_ or 90_b_ is operable to play back artificial information elements during any one field. During the next field, the previously inoperable leading and trailing pickups are rendered operable, and the previously operable leading and trailing pickups are rendered inoperable.

This switching between the pickups can be performed by the playback processor circuit illustrated in FIG. 4, wherein the multivibrator 91 associated with the leading pickup is in a first state which inhibits gates 92_a_ and 92_b_ from conducting played back leading artificial information elements received from leading pickups 82_a_ and 82_b_, respectively and enables gates 98_a_ and 98_b_ to conduct played back leading artificial information elements received from leading pickups 88_a_ and 88_b_, respectively. In addition, the bistable multivibrator 93 associated with the trailing pickups is in a first state which enables gates 96_a_ and 96_b_ to conduct played back trailing artificial information elements received from pickups 86_a_ and 86_b_, respectively, and inhibits gates 100_a_ and 100_b_ from conducting played back information elements received from pickups 90_a_ and 90_b_, respectively.

For the next field, as the vertical sync pulse $f_V$ is received, the bistable multivibrators 91 and 93 are toggled to change states so that: the gates 92_a_ and 92_b_ are enabled to conduct played back leading artificial information elements from the leading pickups 82_a_ and 82_b_, respectively, while the gates 98_a_ and 98_b_ are inhibited from conducting played back leading artificial information from the leading pickups 88_a_ and 88_b_, respectively; and the gates 100_a_ and 100_b_ are enabled to conduct played back trailing artificial information elements from the trailing pickups 100_a_ and 100_b_, respectively, while the gates 96_a_ and 96_b_ are inhibited from conducting played back trailing artificial information elements received from the trailing pickups 86_a_ and 86_b_, respectively.

Figure 5:
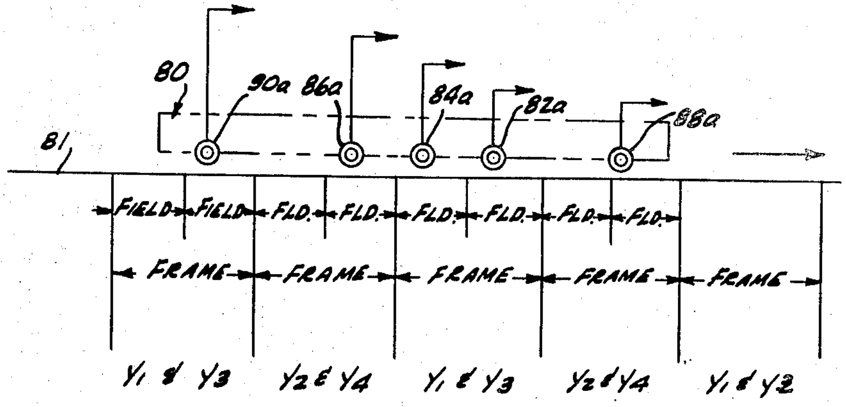
FIG. 5 is a schematic side elevation showing the relationship between playback pickups and the segments of magnetic tape having interlaced fields of even and odd information elements recorded thereon.

For example, during the relative positions of the magnetic tape 81 and pickup 80, illustrated in FIGS. 4, 5, and 6, as the magnetic tape is traveling from left-to-right, the real time pickup 84_b_ plays back real time information element one-third from line 3 of the first field in an odd frame. Then one-third of a real time sampling period after the real time pickup 84_b_ has played back the recorded information from the centroid of a real time information element $Y_3$ of the real time field, the trailing pickup 86_a_ will play back a trailing artificial element $Y_{1T}$ derived from the recorded information associated with the corresponding portion or centroid of the information element $Y_1$ of the preceding interlaced line (line 2) of a trailing field or three fields downstream of the real time field. Then one-third of a sampling period later, the leading pickup 88_b_ will play back a leading artificial element $Y_{3L}$ derived from the centroid of the information element $Y_3$ of the following interlaced line (line 4) of the leading field. These two artificial information elements $Y_{1T}$ and $Y_{3L}$ fill in what would otherwise be a blank information segment $Y_4$ since the even-numbered information elements $Y_2$ and $Y_4$ are not played back during this field or frame. One-third of a sampling period later, the real time element $Y_1$ derived from the centroid of the element $Y_1$ of the real time field is played back by the real time pickup 84_a_. Thereafter, at spaced intervals of one-third of a sampling period, the trailing pickup 86_b_ will play back the trailing artificial element $Y_{3T}$ from the preceding interlaced line (line 2) of a trailing frame, or three fields downstream of the real time field; and next the leading pickup 88_a_ will play back the leading artificial element $Y_{1L}$ from the subsequent interlaced line (line 4) of the leading field to fill in the blank information segment $Y_2$. This pattern is repeated for the entire first odd field.

During the subsequent interlaced odd field, the played back information from the leading pickups 82_a_ and 82_b_ and the trailing or lagging pickups 90_a_ and 90_b_ is conducted and played back information from the leading pickup 88_a_ and 88_b_ and the trailing or lagging pickups 86_a_ and 86_b_ is inhibited from being conducted because the vertical sync pulse $f_V$ toggles the bistable multivibrator 91 and 93 to switch their states. More specifically, the outputs of the flip-flop 91 enable the gates 100_a_ and 100_b_ to conduct the played back odd information elements from the preceding interlaced line of a trailing field three field downstream of the real time field and enables the gates 92_a_ and 92_b_ to conduct the played back odd information elements from the subsequent interlaced line of the leading field, one field upstream.

During the next frame or the arbitrarily designated even frame, the even numbered information elements $Y_2$ and $Y_4$ are played back and recombined in much the same manner as the odd numbered elements $Y_1$ and $Y_3$ were. For example, during the first field of the even frame, the played back video information from the real time pickups 84_a_ and 84_b_ are conducted directly, and the played back video information from the leading pickups 88_a_ and 88_b_, and the trailing pickups 86_a_ and 86_b_ are conducted through the enabled gates 98_a_ and 98_b_ and 86_a_ and 86_b_, respectively, since the bistable multivibrators 91 and 93 were toggled by the vertical sync signal $f_V$ preceding the field.

As a result, the circuit of FIG. 4 combines the non-cross-hatched even-numbered elements $Y_2$ and $Y_4$ illustrated in FIG. 6. For example, referring to horizontal video line 5 on the diagram of FIG. 6, the real time element $Y_4$ is played back first by the real time pickup 84_b_. Then one-third of a sampling period later, the trailing artificial element $Y_{2T}$ is played back from the preceding interlaced line one field downstream of the real time field by the trailing pickup 86*a* to partially fill in the otherwise blank information segment $Y_1$. Then one-third of a sampling period later, the leading artificial element $Y_{4L}$ is played back from the following interlaced line of the leading field three fields upstream by the pickup 88*b* to fill in the rest of the otherwise blank information segment. Then one-third of a sampling period later, the real time element $Y_2$ is played back by the pickup 84*a*. Following this real time element a trailing artificial element $Y_{4T}$ is played back by the pickup 86*b*, followed by a leading artificial element $Y_{2L}$ played back by the leading pickup 88*a*, and so forth, in the same repetitive pattern.

Just preceding the start of the second field of the even frame, the bistable multivibrators 91 and 93 are toggled by the vertical sync pulse $f_v$ to change their states. In response to the outputs of multivibrator 91, the played back video information from the leading pickups 82*a* and 82*b* are enabled to be conducted through the gates 92*a* and 92*b*, respectively, while the leading video information played back from the leading pickups 88*a* and 88*b* are inhibited by the gates 98*a* and 98*b*, respectively. In response to the outputs for bistable multivibrator 93, the trailing artificial elements from the trailing pickups 90*a* and 90*b* are conducted through the enabled gates 100*a* and 100*b*, while the played back artificial elements from the pickups 86*a* and 86*b* are inhibited from being conducted through the gates 96*a* and 96*b*, respectively. The real time elements $Y_2$ and $Y_4$ played back by the real time heads 84*a* and 84*b*, and the artificial elements conducted through the enabled gates, are recombined in the pattern described with reference to FIG. 6.

Since the subsequent field will be the first field of the odd numbered frame, the previously described operation in the odd numbered played back sequence is again repeated.

The played back real time elements and the leading and trailing artificial elements are recombined on two channels where they are alternately conducted through the two OR gates 102*a* and 102*b* in the above described sequence, where first, gate 102*a* conducts a signal, then 102*b* conducts a signal.

Although the above-described circuit of FIG. 4 has combined the leading artificial information from a subsequent interlaced line of a preceding field and the trailing artificial information from a preceding line of a lagging or following field, it would be possible to use the circuit of FIG. 4 to derive leading artificial elements from a preceding interlaced line of a leading field, and the trailing artificial information elements from a subsequent interlaced line of a trailing by interchanging the small increment of spacing of the above described leading pickups and lagging pickups with one another.

The two channels of processed sampled data are fed to the decoder 24 and the played back pilot signal P is fed to the synchronizer 26.

The synchronizer 26, illustrated in FIG. 1, can be of the type described in my previously referenced copending patent application S.N. 563,763 wherein a phase-lock loop having a VCO (voltage controlled oscillator) is responsive to the phase of the played back pilot signal P. By dividing the frequency of the output of the VCO described therein, it is possible to generate an output signal $3f_s$ having a repetition rate or frequency which is three times the frequency of the sampling signal $f_s$. As a result, the two channels of played back output signals will be alternately sampled by the decoder at a rate of one-third of a sampling period in accordance with the requirements of the preferred embodiment. Of course, it should be understood that for other sampling patterns, other rates may be preferred.

Referring to the decoder 24 illustrated in FIG. 7, the separate channels of video information played back from the recorder 20 are fed to video gates 103 and 104. The video gates 103 and 104 are alternately enabled by the complementary pulse signals received from a sampling pulse train generator 106 in response to the frequency multiplied sampling sync signal $3f_s$ received from the synchronizer 26 so that the two channels of played back luminance information are alternately conducted to a summing circuit 108. The resultant output from the summing circuit 108 is a composite of the real time and artificial elements played back on the separate channels and is fed through an amplifier 110 to the television receiver (not shown), where the video information is displayed in the manner illustrated in FIG. 6.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. In a television system of the type in which a series of interlaced fields of video information is sequentially received in at least one sampled pattern of spaced information elements that are repeated every "X" video lines in a stable diagonal pattern, an improvement therein of:

first means coupled to receive the spaced information elements for conducting the received spaced information elements to an output as real time information elements; and second means coupled to sequentially receive the spaced information elements from the two interlaced horizontal lines, adjacent the real time line, of at least two others of the series of interlaced fields as artificial information elements for continually conducting the received artificial information elements to said output during the time interval between sequential real time information elements in vertical registry with its position on the interlaced horizontal line.

2. The system of claim 1 in which said second means is operable to sequentially receive information elements from the preceding adjacent interlaced line of a trailing field and the following adjacent interlaced line of a leading field.

3. The system of claim 1 in which sequential information elements are alternately received on two channels.

4. The system of claim 1 in which the sequential information elements are received at equally-spaced time intervals with the information elements on adjacent lines of the same field being staggered relative to their vertical registry by integral multiples of one-third of a sampling period.

5. The system of claim 1 including a recorder means for recording the series of interlaced fields of video information and said first means and said second means includes pickup means for playing back the video information recorded in said recorder means.

6. The system of claim 1 in which said first means and said second means include a plurality of pickup means, said pickup means associated with said first means being operable to pick up the information elements from a real time one of the series of interlaced fields, said pickup means associated with said second means being operable to pick up artificial information elements from the subsequent adjacent interlaced line of one of two possible leading fields and artificial information elements from the preceding adjacent interlaced line of one of two possible trailing fields.

7. The system of claim 6 in which said pickups of said second means includes at least one pair of leading pickups and at least one pair of lagging pickups, one of said pairs of pickups including a first pickup means spaced one field, and one horizontal video line from, and the other pickup means spaced three fields, and one horizontal line from one side of said pickup associated with said first means, and said other pair of pickups having a first pickup means spaced one field, and one interlaced line from and another pickup means spaced three fields, and one interlaced line, from the other side of said pickup associated with said first means.

8. The system of claim 6 in which sequential information elements are alternately received on two channels.

9. The system of claim 6 in which the sequential information elements are received at equally-spaced time intervals with the information elements on adjacent lines being staggered relative to their vertical registry by integral multiples of one-third of a sampling period.

10. The system of claim 6 including a recorder means for recording the series of interlaced fields of video information and said first means and said second means includes pickup means for playing back the video information recorded in said recorder means.

11. In a television system of the type in which a series of interlaced fields of video information is sequentially received in two stable sampled patterns of spaced information elements in a diagonal pattern that are repeated every "X" video lines, one pattern including only the odd numbered ones of information elements and the other pattern including only the even numbered ones of the information elements, an improvement therein of:

first means coupled to receive the patterns of information elements for conducting the received information elements to an output as real time information information elements; and second means coupled to sequentially receive the information elements from at least one adjacent interlaced horizontal line adjacent the real time horizontal line of at least two others of the interlaced series of fields as artificial information elements for conducting the received artificial information elements to an output during the time interval between sequential real time information elements in vertical registry with its position on the interlaced horizontal line.

12. The system of claim 11 in which said first means and said second means include a plurality of pickup means, said pickup means associated with said first means being operable to pick up the information elements from a real time one of the series of interlaced fields, said pickup means associated with said second means being operable to pick up artificial information elements from the subsequent interlaced line of one of two possible leading fields and artificial information elements from the preceding interlaced line of one of two possible trailing fields.

13. The system of claim 11 in which said pickups of said second means includes at least one pair of leading pickups and at least one pair of lagging pickups, one of said pairs of pickups including a first pickup means spaced one field, and one horizontal video line, and another pickup means spaced three fields, and one horizontal video line from one side of said pickup associated with said first means, and said other pair of pickups having a first pickup means spaced one field, and one video line and another pickup means spaced three fields, and one video line, from the other side of said pickup associated with said first means.

14. The system of claim 13, further including means responsive to a base frequency signal for switching states between each field for alternately enabling only one pickup means of said leading pair of pickups and only one pickup means of said lagging pair of pickups to conduct playback signals on a field-by-field basis.

15. The system of claim 11 in which the sequential information elements are received at equally-spaced time intervals with the sampled information elements on adjacent lines of the same field being staggered relative to their vertical registry by one-third of a sampling period.

16. The system of claim 15 including a recorder means for recording the series of interlaced fields of video information and said first means and said second means include pickup means for playing back the video information recorded in said recorder means.

17. The system of claim 11 in which said first means and said second means include a plurality of pickup means, said pickup means associated with said first circuit means being operable to pick up the information elements from a real time one of the series of interlaced fields, said pickup means associated with said second means being operable to pick up artificial information elements from the subsequent interlaced line of one of two possible lagging fields and artificial information elements from the preceding interlaced line of one of two possible leading fields.

18. The system of claim 17 in which said pickups of said second means includes at least one pair of leading pickups and at least one pair of lagging pickups, one of said pairs of pickups including a first pickup means spaced one field, and one horizontal video line, and another pickup means being spaced three fields, and one horizontal video line from one side of said pickup associated with said first means, and said other pair of pickups having a first pickup means spaced one field, and one video line and another pickup means spaced three fields, and one video line from the other side of said pickup associated with said first means.

19. The system of claim 18, further including means responsive to a base frequency signal for switching states between each field for alternately enabling only one pickup means of said leading pair of pickups and only one pickup means of said lagging pair of pickups to conduct playback signals on a field-by-field basis.

20. The system of claim 19 in which sequential information elements are alternately received on two channels.

References Cited

UNITED STATES PATENTS

| | | | |
|---|---|---|---|
| 2,836,651 | 5/1958 | Johnson | 178—6.6 |
| 2,921,124 | 1/1960 | Graham | 178—6 |
| 3,359,365 | 12/1967 | Kihara | 178—5.4 |
| 3,366,739 | 1/1968 | Parkinson | 179—15.55 |
| 3,372,228 | 3/1968 | Law | 178—5.4 |
| 3,391,248 | 7/1968 | Hirota | 178—6.6 |
| 3,392,233 | 7/1968 | Houghton | 178—6.6 |

BERNARD KONICK, Primary Examiner

S. B. POKOTILOW, Assistant Examiner

U.S. Cl. X.R.

178—6